US008238927B2

(12) United States Patent
Saito et al.

(10) Patent No.: US 8,238,927 B2
(45) Date of Patent: Aug. 7, 2012

(54) OFDM CELLULAR COMMUNICATION METHOD, SYSTEM AND BASE STATION

(75) Inventors: Toshiyuki Saito, Kokubunji (JP); Rintaro Katayama, Kokubunji (JP); Akihiko Yoshida, Yokohama (JP); Shiro Mazawa, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 1155 days.

(21) Appl. No.: 11/843,706

(22) Filed: Aug. 23, 2007

(65) Prior Publication Data

US 2008/0146238 A1 Jun. 19, 2008

(30) Foreign Application Priority Data

Dec. 15, 2006 (JP) ................................. 2006-338626

(51) Int. Cl.
*H04W 72/00* (2009.01)
*H04L 12/28* (2006.01)
*H04B 7/212* (2006.01)
*H04B 1/00* (2006.01)
*H04K 1/10* (2006.01)
(52) U.S. Cl. ...................... 455/452.1; 455/453; 375/260; 375/132; 370/431; 370/442
(58) Field of Classification Search .................. 375/260, 375/132; 370/431, 442; 455/452.1, 453
See application file for complete search history.

(56) References Cited

U.S. PATENT DOCUMENTS

| 6,898,431 | B1 * | 5/2005 | Peele ........................... 455/453 |
| 7,403,748 | B1 | 7/2008 | Keskitalo et al. |
| 2005/0249322 | A1 | 11/2005 | Gerlach |
| 2005/0288025 | A1 | 12/2005 | Yoshida et al. |
| 2006/0120477 | A1 | 6/2006 | Shen et al. |
| 2006/0291371 | A1 * | 12/2006 | Sutivong et al. .............. 370/208 |

FOREIGN PATENT DOCUMENTS

| CN | 1694558 A | 11/2005 |
| JP | 5-110499 | 4/1993 |
| JP | 2006-013826 | 1/2006 |
| WO | WO 01/78254 A1 | 10/2001 |

OTHER PUBLICATIONS

Third Generation Partnership Project 2 ("3GPP2"), Procedures and Messages for the InUse Instance of the Protocol, Section 8.7.6, C.S0024-A V3.0 (Sep. 2009) (http://www.3gpp2.org/Public_html/specs/C.S0024-A_v.3.0_060912.pdf).

(Continued)

*Primary Examiner* — Kamran Afshar
*Assistant Examiner* — Omoniyi Obayanju
(74) *Attorney, Agent, or Firm* — Brundidge & Stanger, P.C.

(57) ABSTRACT

Since the OFDM communication method does not select whether plural sectors use a same terminal as a transmission destination, or always use it as a transmission destination, giving a preference to system throughput deteriorates channel quality of a terminal in a sector boundary, while increasing channel quality in sector boundaries greatly deteriorates system throughput. In a base station, when a sector transmits to a terminal in the front of a beam, only the sector performs the transmission, and when transmission is made to a terminal in a sector boundary off the direction of the beam, a different sector transmits to the same terminal using a same hopping pattern. Thereby, tradeoff between the channel quality of the terminal in a sector boundary and deterioration in system throughput can be minimized.

23 Claims, 19 Drawing Sheets

OTHER PUBLICATIONS

Third Generation Partnership Project 2 ("3GPP2"), Administration of Parameter Value Assignments for cdma2000 Spread Spectrum Standards, Release E, C.R1001-E V1.0 (Oct. 2005) (http://www.3gpp2.org/Public_html/specs/C.R1001-E_v1.0_051004.pdf).

3 GPP TR 25.814 v7.0.0. (Jun. 2006), $3^{rd}$ Generation Partnership Project; Technical Specification Group Radio Access Network; Physical layer aspects for evolved Universal Terrestrial Radio Access (UTRA), (Release 7).

"MBFDD and MBTDD: Proposed Draft Air Interface Specification", IEEE 802.20 Working Group on Mobile Broadband Wireless Access, Jan. 6, 2006.

"Joint Proposal for 3GPP2 Physical Layer for FDD Spectra", Jul. 31, 2006.

Japanese translation of The Notice of First Rejection in Chinese Application No. 200710146882.2, dispatched Mar. 9, 2011.

European Search Report in European Application No. 07016121.1 dispatched Mar. 10, 2011.

\* cited by examiner

OFDM CELLULAR COMMUNICATION METHOD, SYSTEM AND BASE STATION

CLAIM OF PRIORITY

The present application Claims priority from Japanese application JP 2006-338626 filed on Dec. 15, 2006, the content of which is hereby incorporated by reference into this application.

BACKGROUND OF THE INVENTION (1) Field of the Invention

The present invention relates to cellular radio communication technology that adopts orthogonal frequency division multiplex (OFDM) in radio communication.

(2) Description of the Related Art

Research and development is underway on radio communication systems that adopt OFDM (Orthogonal Frequency Division Multiplex). OFDM produces data to be transmitted in a frequency domain, converts it into a signal of a time domain by IFFT (Inverse Fast Fourier Transform), and transmits it as a radio signal. A receiving side converts the signal of the time domain into a signal of the frequency domain by FFT (Fast Fourier Transform) to extract its original information.

An OFDM cellular radio communication system generally includes plural base station apparatuses and plural terminals, as shown in FIG. 1. A base station apparatus 101 is connected to a network 102 over a wire line. Terminals 103, 104, 105, and 106 are wirelessly connected with the base station apparatus 101 to be communicatable with the network 102. Effective communication with a base station require radio channel conditions of a given level or higher, and are generally governed by a distance from the base station. A range communicatable with a certain base station is referred to as a cell, which has a circular shape like 107 when no shielding matter exists. Terminals perform communication with a base station having the best radio channel condition. Therefore, in the example of FIG. 1, the terminals 103, 104, 105, and 106 that exist in a cell within the base station 101 communicate with the base station 101 as a communication destination.

When the number of communication terminals per base station is many like cellular radio, the base station communicates with plural terminals at the same time using directional beams 201, 202, and 203 having different directions, as shown in FIG. 2. In this case, one cell is logically split by the number of directional beams; the logically split unit is referred to as a sector.

FIG. 2 shows an example of CDMA (Code Division Multiple Access) 2000 1xEV-DO (Evolution Data Only) system. The number of sectors is 3, and the terminals 103 and 106 use a beam 201 and the terminals 104 and 105 use beams 202 and 203, to communicate with the base station 101. Hereinafter, sectors corresponding to the beams 201, 202, and 203 are defined as sectors 1, 2, and 3.

In FIG. 1, when a terminal in a cell boundary receives data transmission from a base station, since interference power (power originating in a base station other than a communication destination) is stronger than signal power of the base station of a communication destination, channel quality deteriorates. This is also true for terminals in sector boundaries in FIG. 2. As means for reducing the influence, for example, as shown in FIG. 3, frequency hopping patterns of OFDM can be used. FIG. 3 shows different patterns for different sectors. To perform communication with a given user, the sector 1 uses time and frequency such as a pattern 301, and the sector 2 uses a pattern 302 likewise. In an identical sector, patterns with offset of a frequency direction appended are used to avoid the overlap of time and frequency resources of individual users. Use of such patterns 301 and 302 reduces the rate of the overlapping of time and frequencies with users of other sectors such as 303. Since the terminals demodulate corresponding frequencies every hour, the hopping helps to suppress interference power. As shown in FIG. 4, by allocating mutually different hopping patterns 401, 402, and 403 to the sectors 1, 2, and 3, each sector can communicate with different terminals at the same time with interference suppressed.

The standardization group IEEE802.20 proposes a radio system based on OFDM, and defines an interference suppression method by the above-described hopping patterns in Section 9.3 of IEEE C802.20-06/04.

The standardization group 3GPP proposes a radio system based on OFDM as LTE (Long Term Evolution), and defines an interference suppression method by the above-described hopping patterns in Section 7.1.2.6 of 3GPP TR 25.814 V7.0.0 (2006-06).

Furthermore, the standardization group 3GPP2 proposes a radio system based on OFDM as LBC (Loosely Backwards Compatible), and defines an interference suppression method by the above-described hopping patterns in Section 1.1 of 33GPP2 C30-20060731-040R4.

In the related art, during communication with different terminals, channel quality greatly changes depending on terminal positions. For example, as shown in FIG. 5, a terminal existing in the front direction of the beam 201 such as the terminal 106 can have high channel quality, while a terminal off the direction of the beam 201 such as the terminal 103 can obtain only low channel quality. Since channel quality information corresponds to data rates, in such a case, the terminal 103 may not obtain a desired data rate.

As one of measures against such a problem, a method of plural sectors operating as substantially one sector by using a same hopping pattern is proposed in IEEE802.20. An example of matching the hopping pattern 402 of the sector 2 to the hopping pattern 401 of the sector 1 is shown in FIG. 6. Since the terminal 103 enables synthesis in signal level by receiving the beams 201 and 202 at the same time, channel quality increases in comparison with reception of the beam 201 alone.

On the other hand, as a method for backing up terminals in cell boundaries, for example, as disclosed in Japanese Patent Application Laid-Open Publication No. H05-110499, for communication with terminals near a base station, hopping patterns permitting concurrent use of other cells and frequencies are used, while for communication with terminals in cell boundaries, patterns not permitting concurrent use is used. This method enables an improvement in channel quality of terminals in cell boundaries while suppressing deterioration of the number of frequency repetitions by switching of hopping patterns.

BRIEF SUMMARY OF THE INVENTION

However, in the proposal of the IEEE802.20, whether to match hopping patterns cannot be changed during operation, and two sectors always operate as one sector. The degree of improving channel quality as a result of synthesizing the beams 201 and 202 is large with terminals near a sector boundary such as the terminal 103. However, with terminals in the front direction of the beam 201 such as the terminal 106, since their channel quality is originally high, the degree of improvement is small. Since constant operation as one sector halves throughput in comparison with individual operations as two sectors, the throughput of the entire system resultantly drops.

On the other hand, as conventional methods for backing up terminals in cell boundaries, patterns resistant to interference of other cells are used to improve channel quality of terminals in cell boundaries, and the idea of backing up terminals in boundaries in cooperation among plural cells is not disclosed.

An object of the present invention is to provide an OFDM cellular radio communication method, a radio communication system, and base station apparatuses that can increase channel quality of sector boundaries while maintaining the throughput of the entire system.

To achieve the above-described object, the present invention provides an OFDM cellular radio communication method by which a cell formed by a base station to communicate with a terminal is split into plural sectors corresponding to the number of directional beams. According to this method, when channel quality to the terminal from the base station is lower than a predetermined threshold, a hopping pattern, that is, a pattern of time and frequency resources, used in a downstream line from the base station to the terminal is used as a pattern of time and frequency resources of a downstream line of a sector different from a sector to which the terminal belongs, for transmission to the terminal in cooperation among plural directional beams.

The present invention switches between a mode in which each sector communicates with different terminals, and a mode in which plural sectors have a same terminal as a transmission destination. Specifically, a base station performs control so that when a sector transmits to a terminal in the front of a beam, only the sector performs transmission, while when the sector transmits to a terminal near a sector boundary off a beam direction, another sector transmits to the same terminal by using the same hopping pattern.

In the present invention, in an OFDM cellular radio communication method by which a cell formed by a base station to communicate with a terminal is split into plural sectors corresponding to the number of directional beams, when the priority of communication of the terminal is higher than a predetermined threshold, a hopping pattern, that is, a pattern of time and frequency resources, used in a downstream line from the base station to the terminal is used as a pattern of time and frequency resources of a downstream line of a sector different from a sector to which the terminal belongs, for transmission to the terminal in cooperation among plural directional beams.

According to the present invention, only when a terminal in a sector boundary is a transmission destination, or when a terminal requiring high priority is a transmission destination, plural sectors cooperate for transmission. Thereby, deterioration in system throughput can be minimized, and reduction in terminal throughput due to position and the like can be prevented.

According to the present invention, in cellular communication based on OFDMA (Orthogonal Frequency Division Multiple Access), deterioration in system throughput can be minimized, and channel quality of terminals near a sector boundary, or terminals requiring high priority can be increased, and bottleneck in QoS assurance service can be eliminated.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE INVENTION

Hereinafter, embodiments of the present invention will be described with reference to the accompanying drawings. Prior to it, cellular radio communication prerequisite to the present invention will be briefly described.

Figure 7:
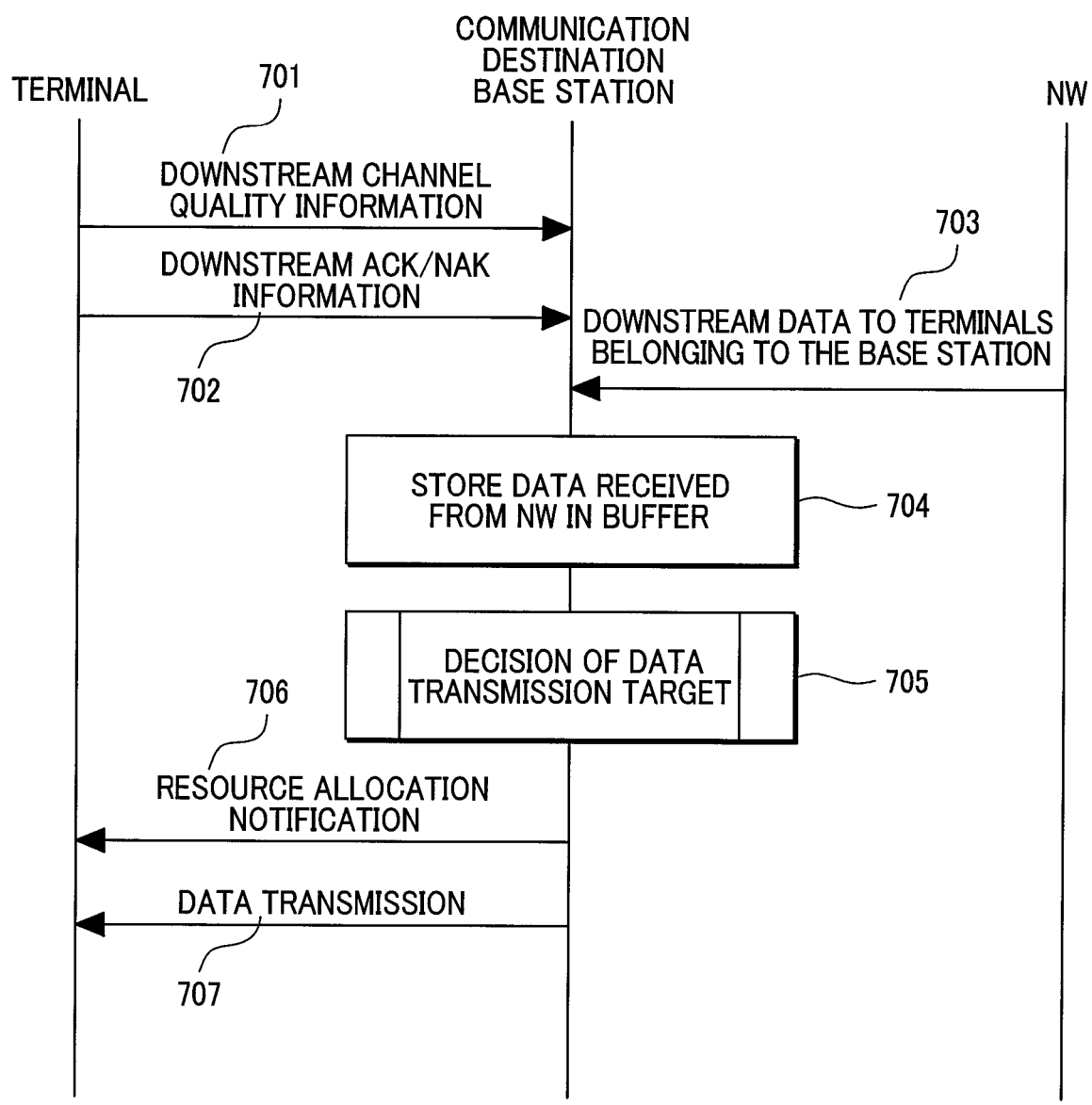
FIG. 7 is a sequence diagram of downstream communication (from base station to terminal) of cellular communication.

General cellular radio communication are performed according to a procedure as shown in FIG. 7. A terminal sends downstream channel quality information 701 to a base station, based on the strength of a transmission signal from the base station. When retransmission control is performed, downstream ACK/NAK (Acknowledge/Negative Acknowledge) information 702 indicating the success or failure of data reception from the base station is also sent. The base station collectively manages data of terminals belonging to subordinate sectors, and on receiving data 703 for belonging terminals from the network, performs buffering processing 704.

The base station performs transmission target update operation 705 (retransmission of data unsuccessfully received, and decision of new transmission destination and transmission rate) at a cycle corresponding to the flaming of wireless link. After the transmission target update operation 705, the base station transmits resource allocation notification 706 and transmission data 707 to the updated destination terminal. The terminal, from the resource allocation notification 706, determines whether to receive the data, time eligible for reception, and a hopping pattern of frequency resource, before receiving the data 707.

Figure 8:
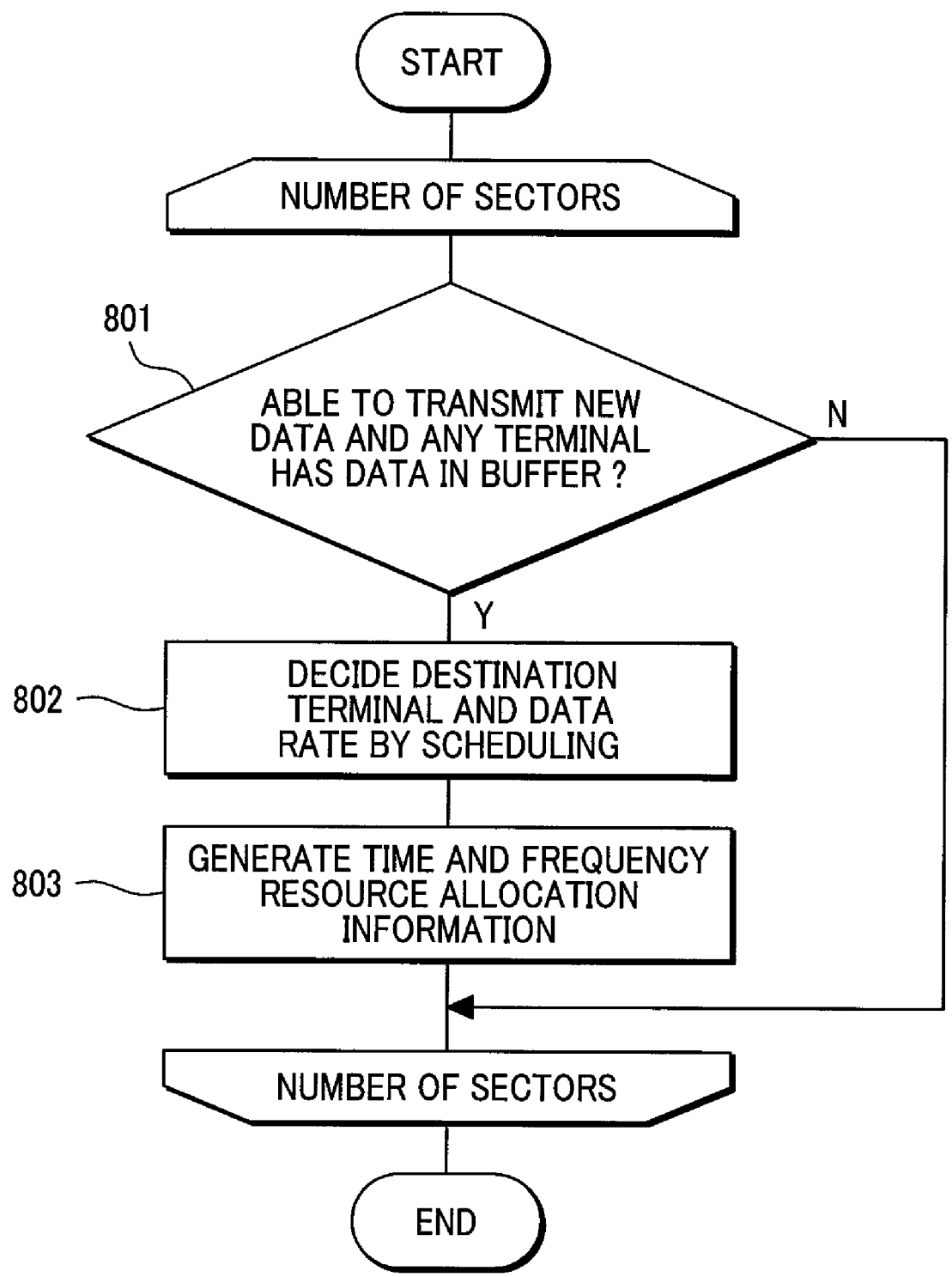
FIG. 8 is a flowchart of transmission target update operation in cellular communication.

FIG. 8 details an operation 705 to decide a data transmission target in FIG. 7. The base station determines, for all subordinate sectors, determines the presence of transmission data to terminals belonging to the sectors and whether to transmit new data (801). Whether to transmit new data can be determined from whether the retransmission control information 702 needs to be retransmitted, or whether the retransmission control information 702 exists or not. When transmission data exists, and it is determined that new data can be transmitted, the base station decides a concrete destination terminal and a transmission data rate (802). When there are plural terminals that desire new data transmission, the base station performs a scheduling operation that decides a destination terminal, based on information such as downstream channel quality information 701. The data rate can be decided using the downstream channel quality information 701. When a destination terminal is decided, the base station generates allocation information of time and a frequency resource used for communicate with the terminal (803), and makes notification to the terminal by the resource allocation notification 706. Thereby, cellular radio communication is enabled between the base station and the terminal.

FIRST EMBODIMENT

A first embodiment of the present invention will be described using FIGS. 9 and 10. In the first embodiment, the base station tries cooperation between sectors when the channel quality information of the destination terminal is below a first threshold, and performs cooperation when a cooperation destination sector does not overlap with resources to be used; when the resources overlap, the base station gives a preference to the cooperation destination sector.

Figure 9:
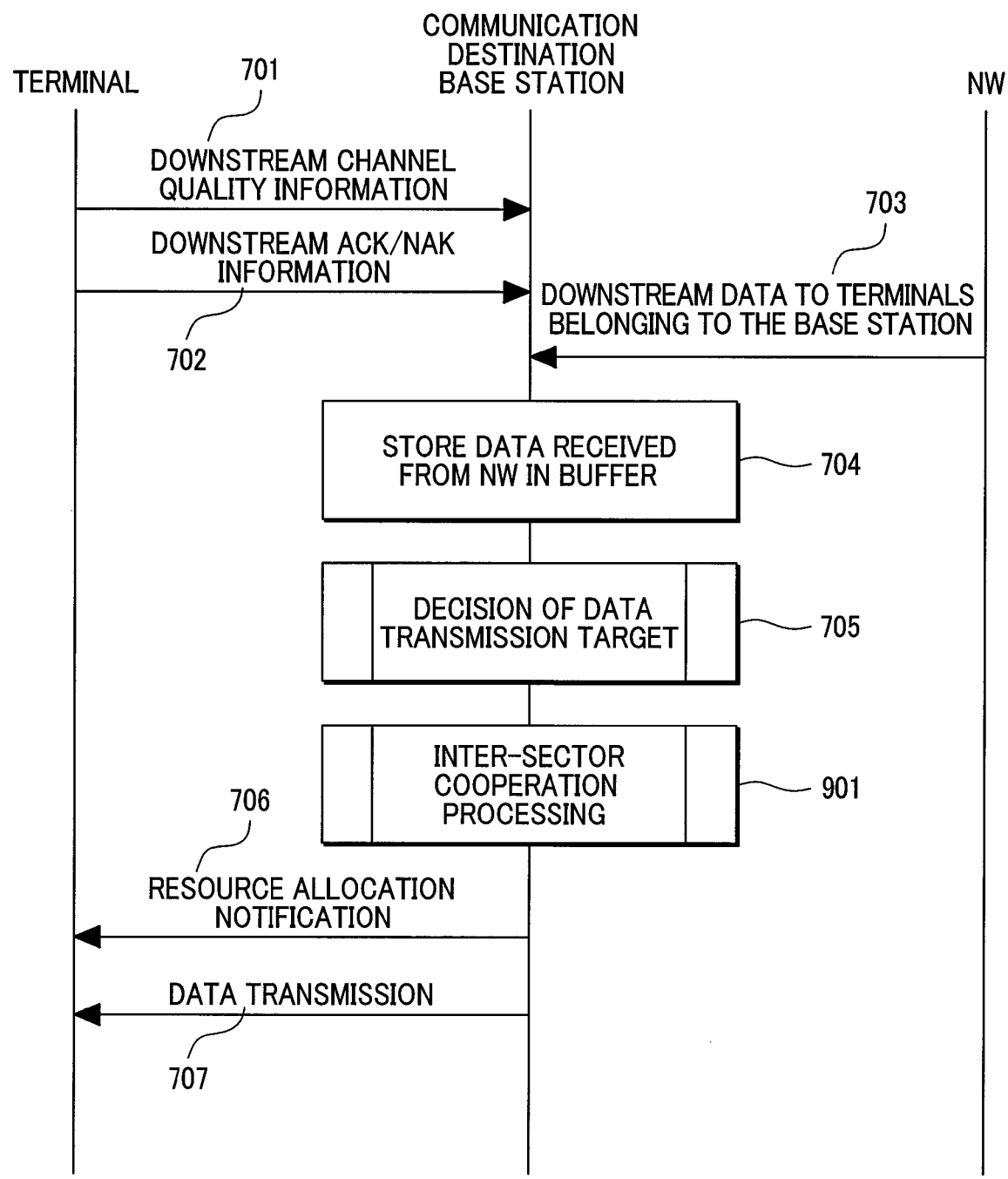
FIG. 9 is a sequence diagram in a first embodiment of the present invention.

FIG. 9 shows a sequence diagram of the first embodiment. Operations of 701 to 707 are the same as those in FIG. 7, except that the base station performs cooperation processing 901 between sectors after the data transmission target decision operation 705.

Figure 10:
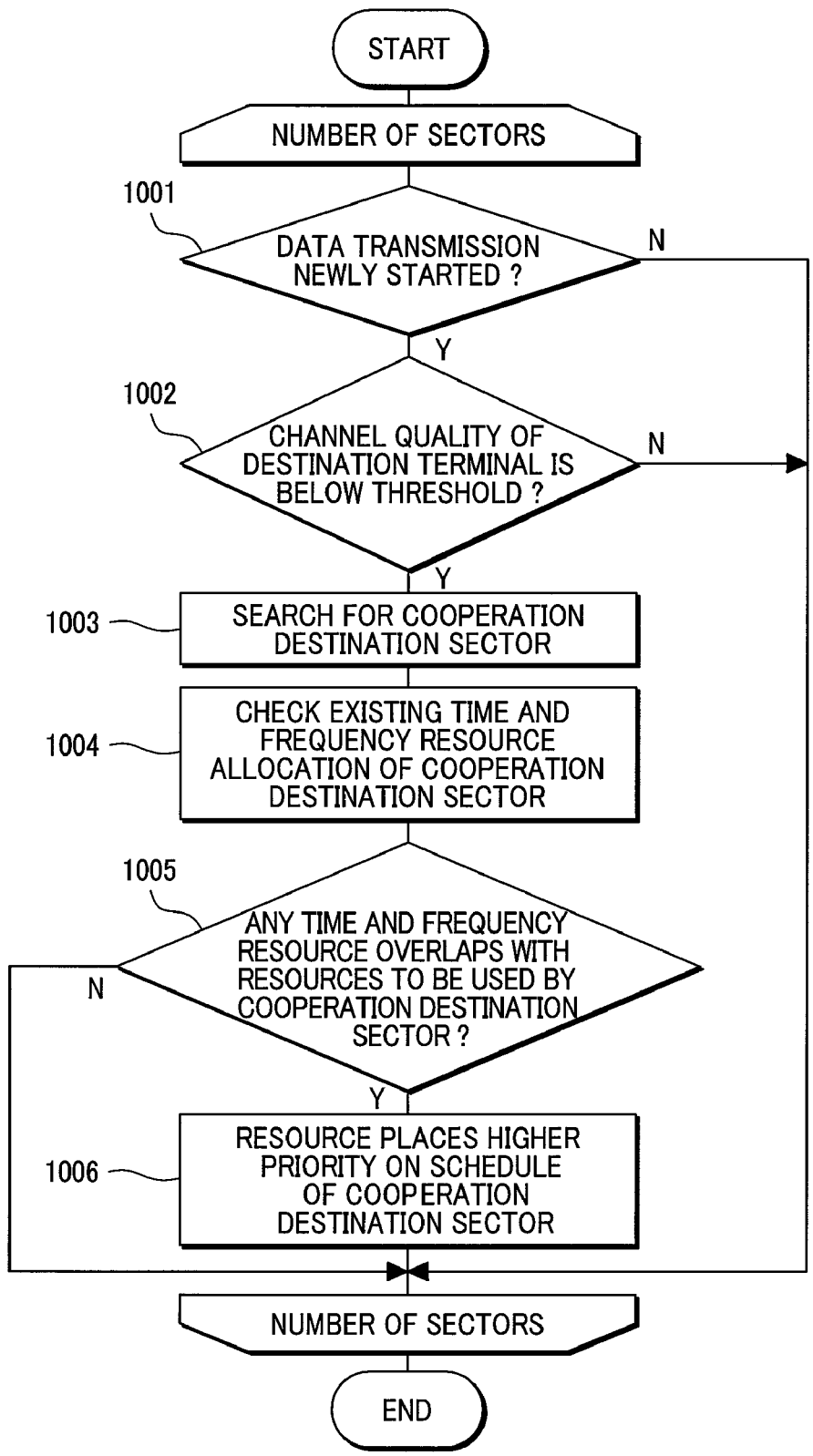
FIG. 10 is a flowchart of inter-sector cooperation operation in a first embodiment.

FIG. 10 details processing operations of the inter-sector cooperation processing 901. The base station determines whether the sectors newly start data transmission (1001), and compares, for sectors found to be true, channel quality information of a destination terminal with a predetermined threshold (first threshold) (1002). This operation 1002, for example, can be realized by referring to downstream channel quality information 701 sent by the terminal and a decided transmission data rate. When the channel quality information is below the first threshold, the base station searches for a subordinate sector that it can cooperate with (1003). A sector of a cooperation destination can be decided by referring to an active set of the terminal and a terminal managed by the base station. Next, the base station checks the use status of time and frequency resources by existing communication of the destination sector (1004), and determines the presence of time and frequency resources that might duplicate during communication by use of hopping patterns of a cooperation source (1005). When they do not duplicate, inter-sector cooperation is performed. When a duplication exists, the resources of the cooperation destination take precedence and are not overwritten (1006) to avoid inter-sector communication.

Figure 17:
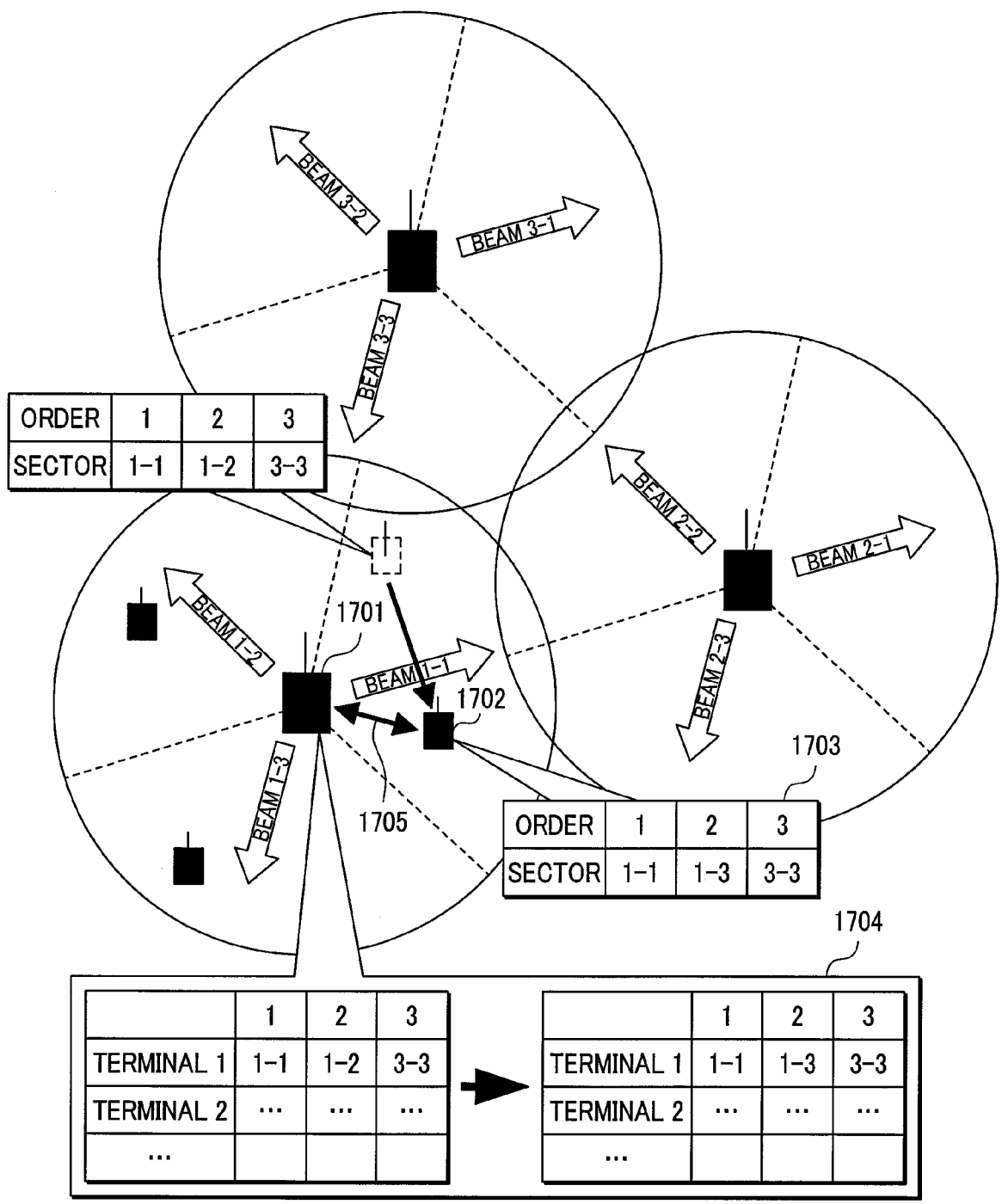
FIG. 17 is a drawing for explaining an active set management method in a cellular system.

Reference to an active set of terminals performed in deciding a cooperation destination sector will be described. Since channel conditions change due to migration and the like, normally, terminals manage a set of sectors having excellent downstream channel quality information including communication destination base stations, and the set is referred to as an active set. The concept of active set management is described using FIG. 17. FIG. 17 shows an example of updating an active set 1703 held by a terminal 1702 with a base station 1701 as a communication destination base station when the terminal 1702 migrates within a range of a sector 1-1. In a position before migration, downstream channel quality information for the terminal 1702 is poorer in the order of sectors 1-1, 1-2, and 3-3, and the terminal 1702 registers the three in an active set 1703.

By communication between the terminal 1702 and the base station 1701, the base station 1701 shares the information, and manages information 1704 of active sets of all belonging terminals. When downstream channel quality information for the terminal 1702 became the order of sectors 1-1, 1-3, and 3-3 in a place to which it migrates, the terminal 1702 shares the information with the base station 1701, and the base station 1701 reports that it updates the active set (1705). Thereby, the active sets of the both are updated to the latest condition. The base station 1701 can decide a cooperation destination sector by thus referring to information 1704 of an active set of managed terminals. Here, since it is recognized by referring to the active set 1704 that the downstream channel quality information for the terminal 1702 has become the order of sectors 1-1, 1-3, and 3-3, when a cooperation destination sector is required, the base station 1701 decides the sector 1-3 as a cooperation destination sector. A concrete configuration of the base station 1701 will be described later.

The standardization group 3GPP2 proposes the management of such active sets, and a method of managing active sets as described above is described in Section 8.7.6 of 3GPP2 C.S0024-A V3.0 (2006-09). In this embodiment, active sets are managed based on the management method.

Figure 18:
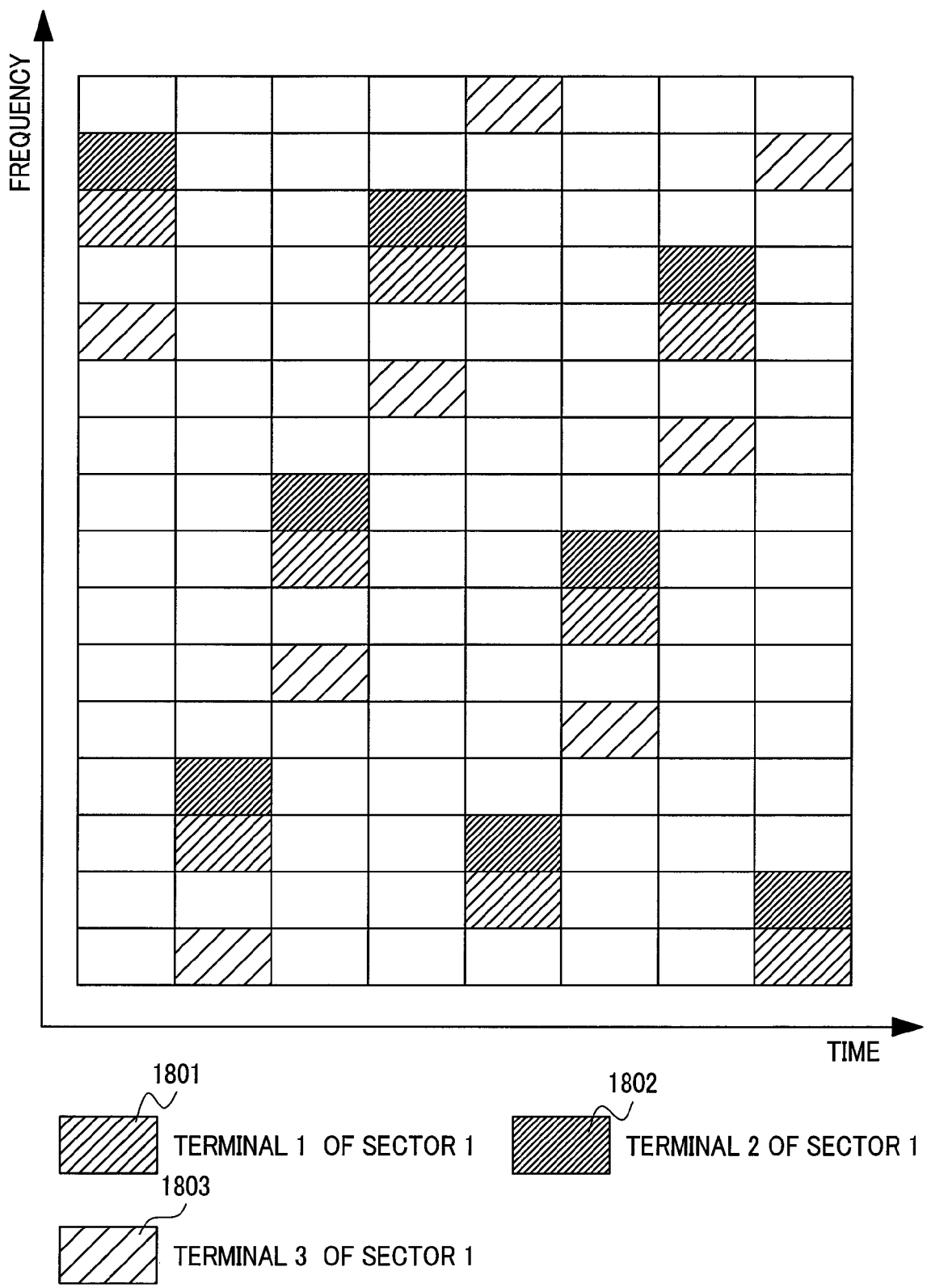
FIG. 18 is a drawing for explaining resource use status of a cooperation destination sector before inter-sector cooperation in a first embodiment.
Figure 19:
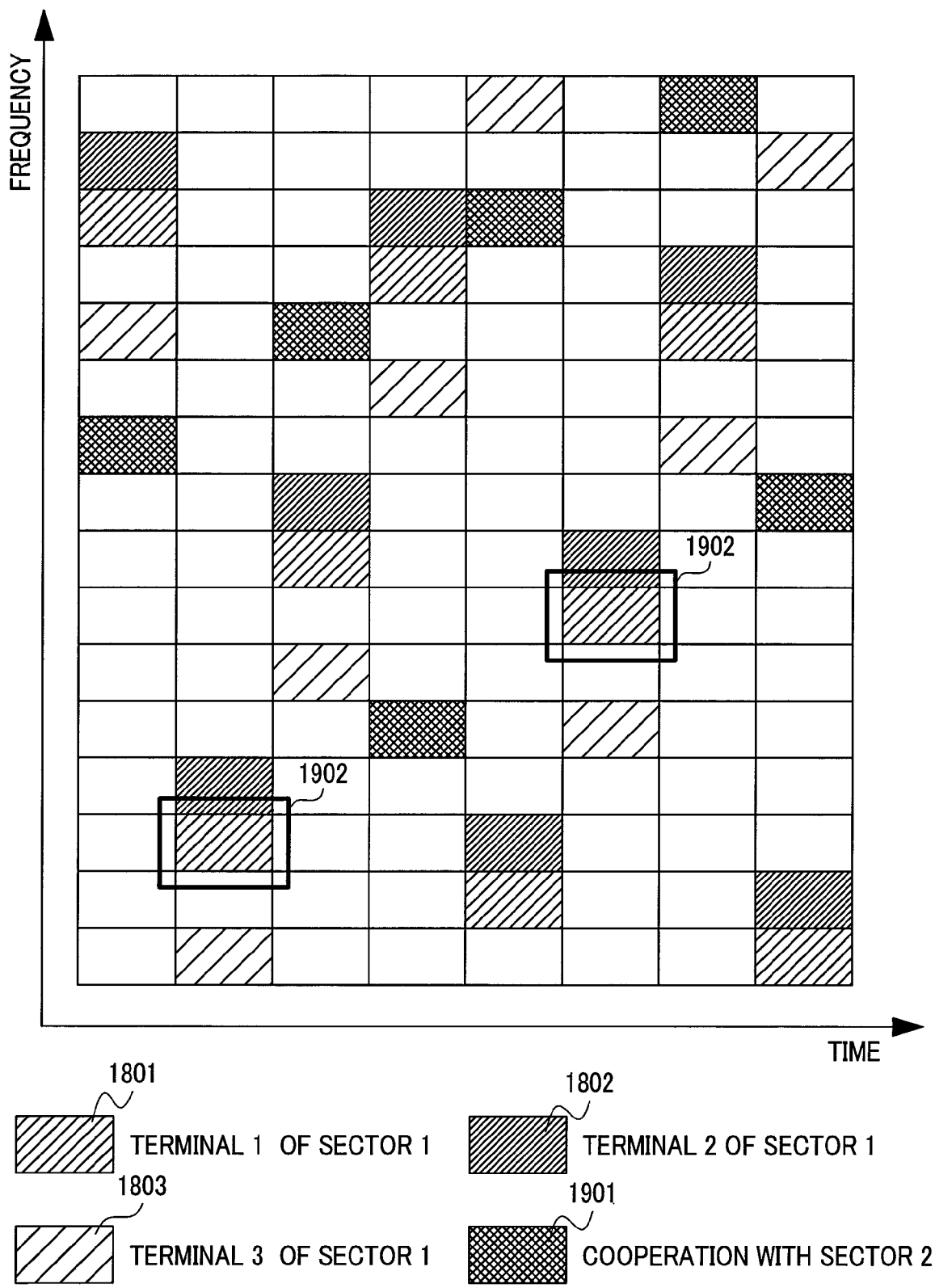
FIG. 19 is a drawing for explaining resource use status of a cooperation destination sector after inter-sector cooperation in a first embodiment.

The following describes the case of cooperating communication to a terminal of the sector 2 with the sector 1 with reference to FIGS. 18 and 19, as a concrete example of steps 1004 to 1006 shown in FIG. 10 in this embodiment. FIG. 18 shows the use status of time and frequency resources of the cooperation destination sector 1, and communication using resources such as patterns 1801 to 1803 are scheduled for three terminals of the sector 1. FIG. 19 shows changes in the resource use status in the sector 1 by cooperation in this embodiment. The base station, to communicate with a terminal belonging to the sector 2, tries to allocate resources based on a hopping pattern 1901 of the sector 2 even in the sector 1.

Figure 1:
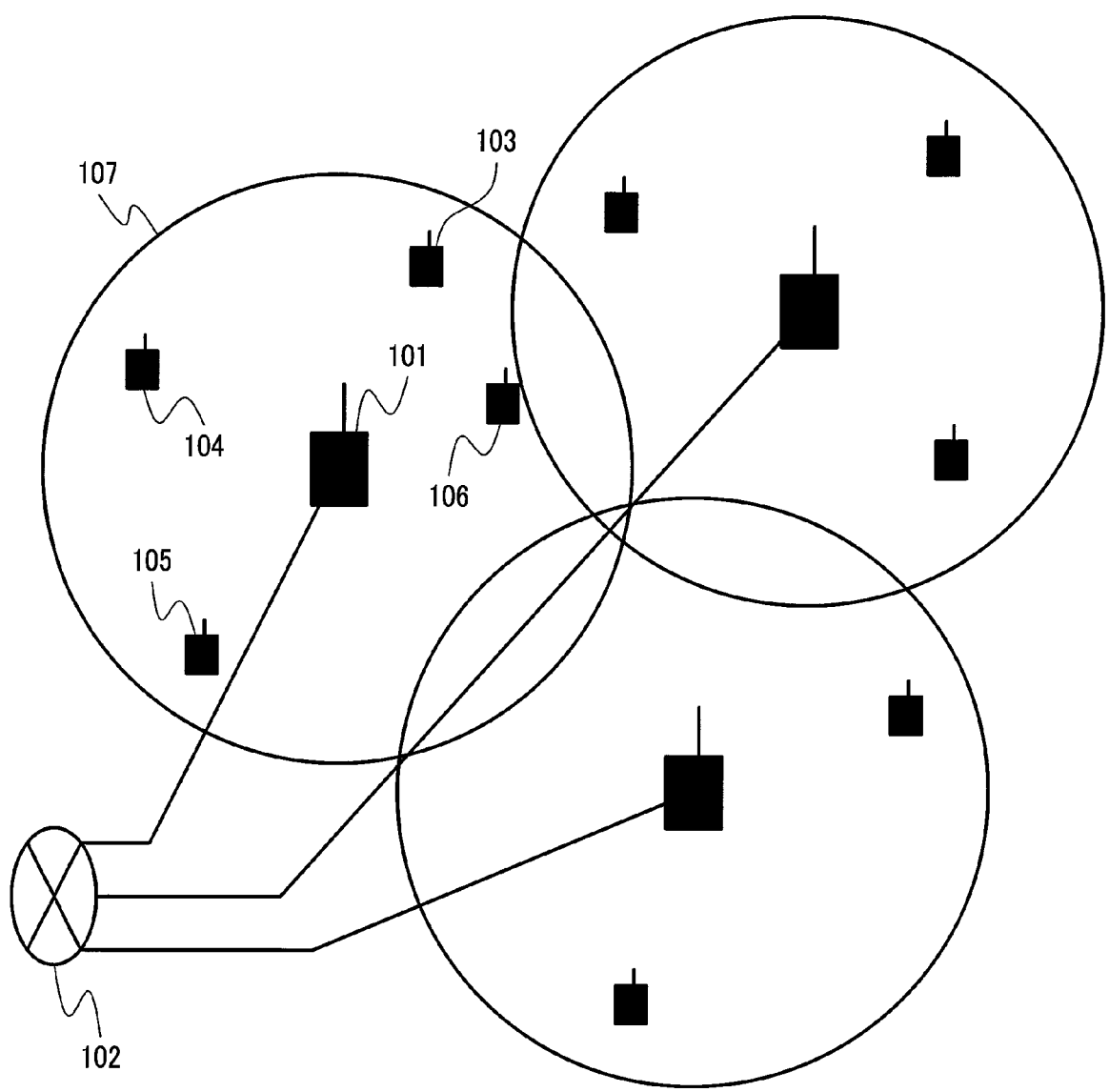
FIG. 1 is a drawing showing a rough construction of an OFDM cellular system.
Figure 2:
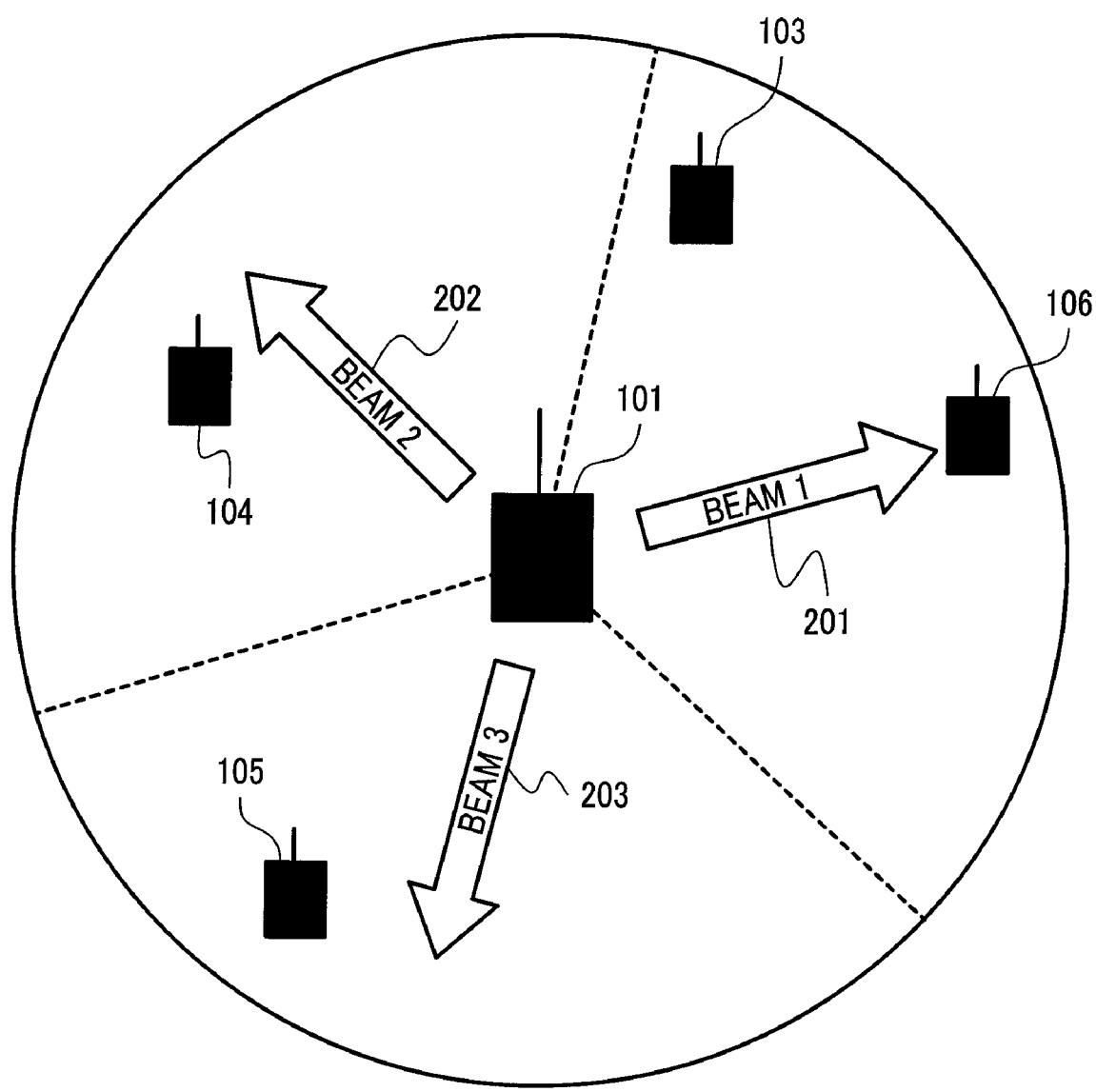
FIG. 2 is a drawing for explaining the concept of logically splitting a communication range of a base station by directional beams.
Figure 3:
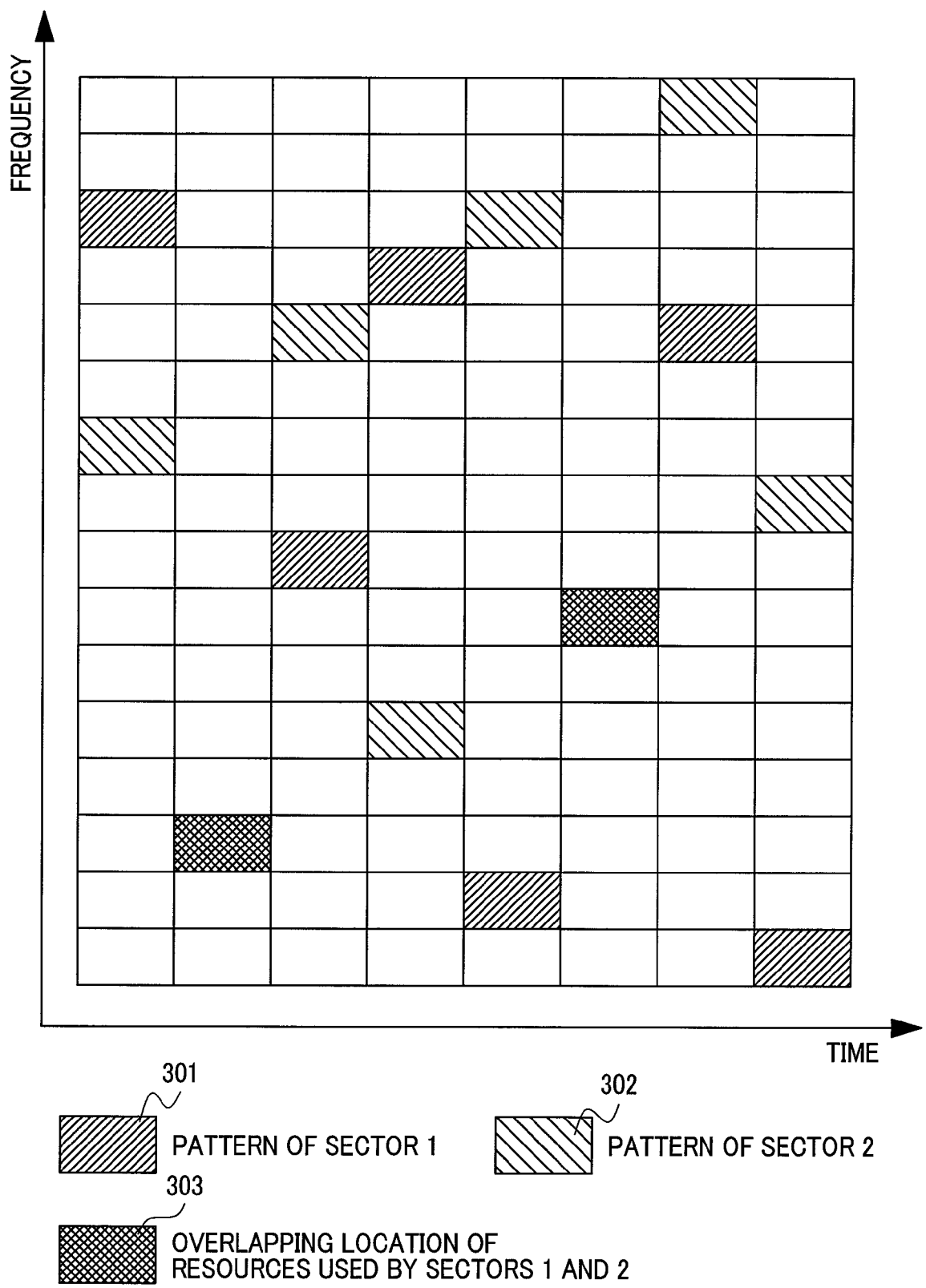
FIG. 3 is a drawing for explaining interference reduction effects between sectors by frequency hopping.
Figure 4:
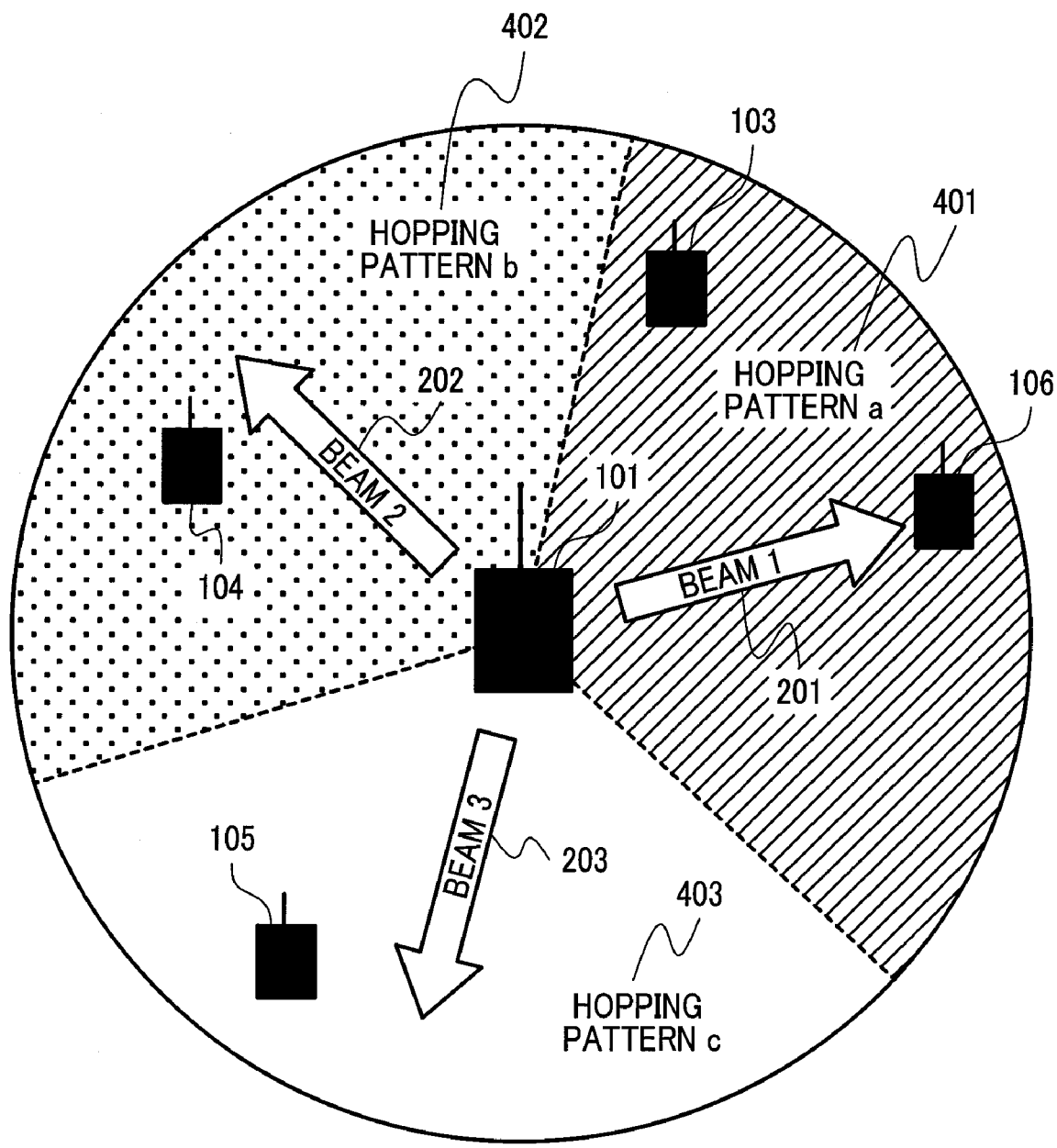
FIG. 4 is a drawing showing an example of performing communication with different terminals on a sector basis by different frequency hopping.
Figure 5:
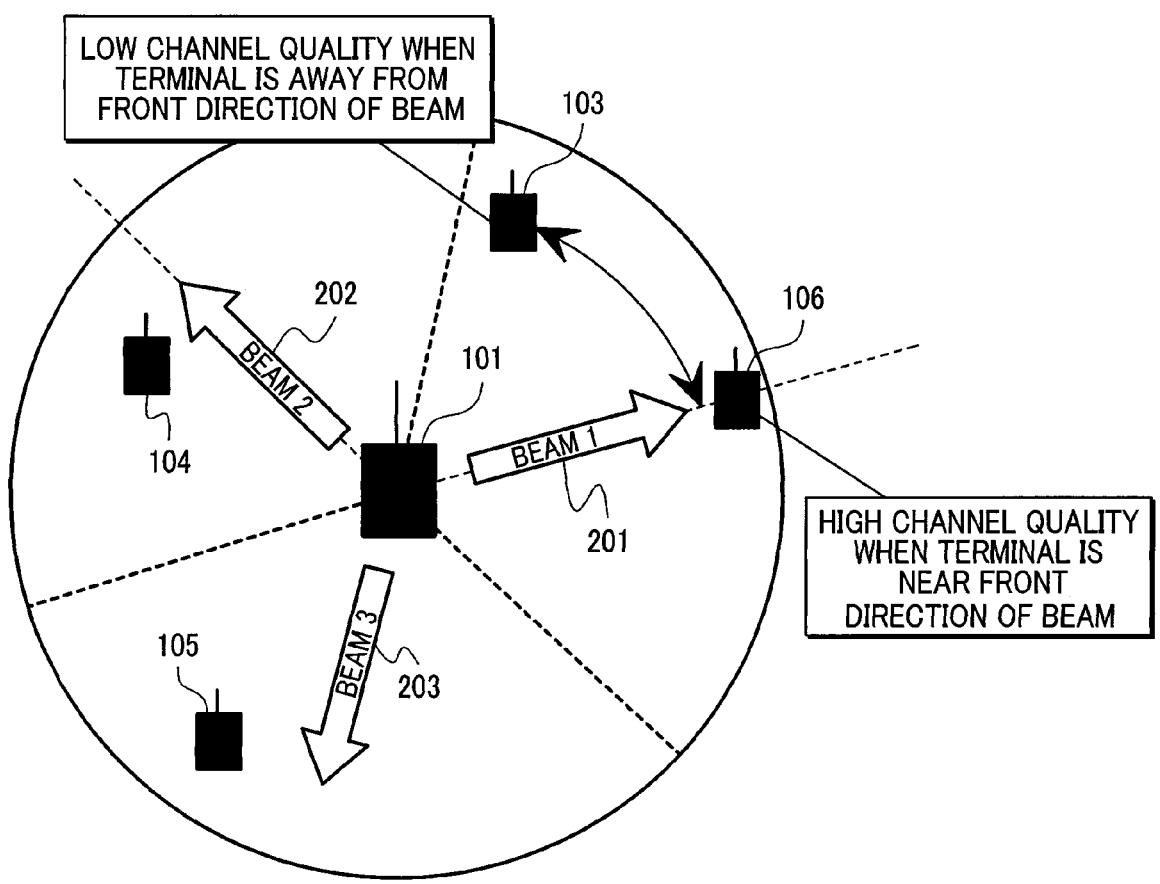
FIG. 5 is a drawing for explaining that differences occur in communication quality for each of terminals, depending on angles formed with respect to a beam direction.
Figure 6:
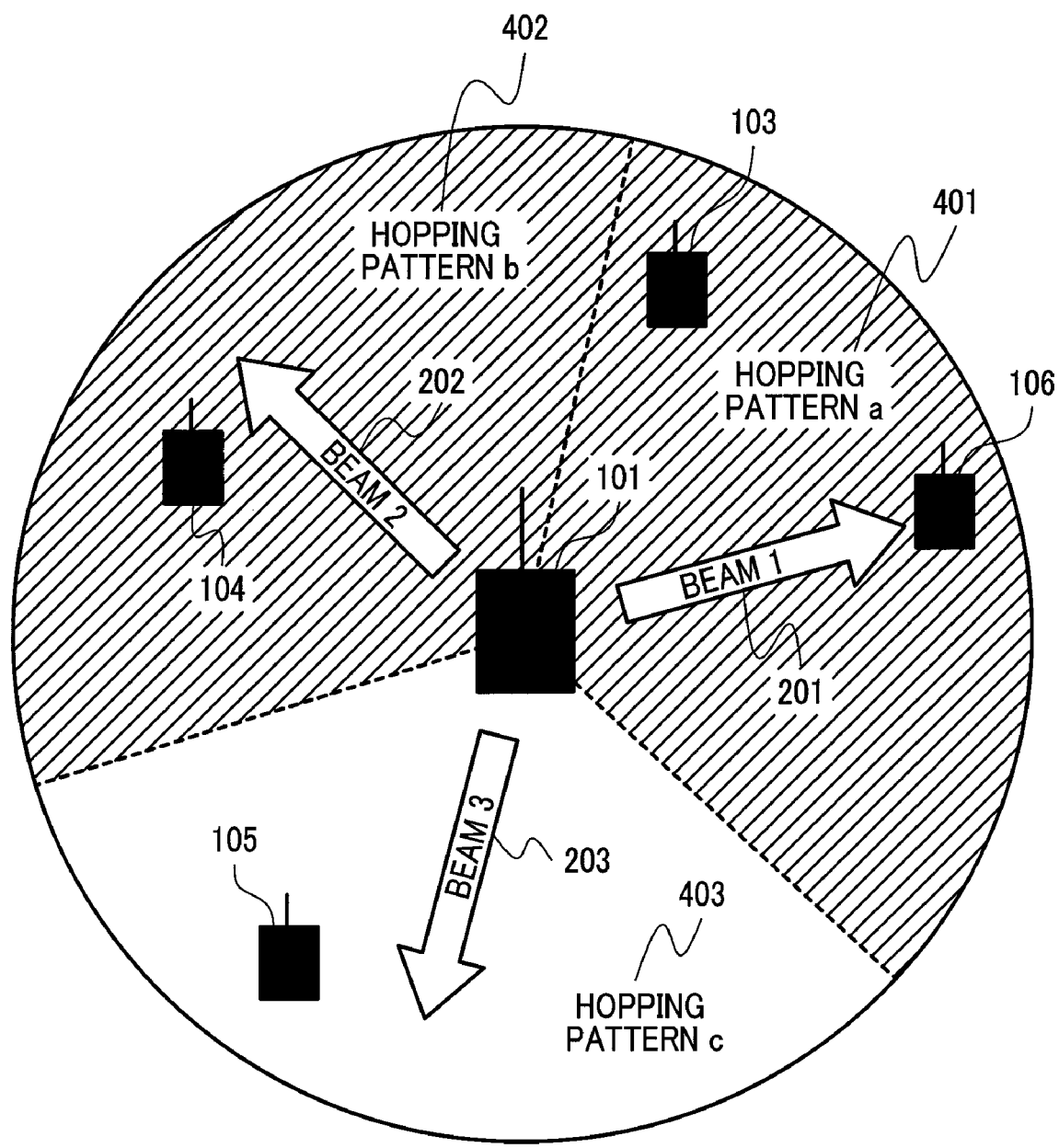
FIG. 6 is a drawing showing the concept of improving communication quality of sector boundaries by use of same hopping patterns over plural sectors.

As shown 303 in FIG. 3, since the sectors 1 and 2 are different in hopping pattern, as 1902 of FIG. 19, resources indicated by a pattern 1901 of time and frequency of a downstream line allocated to the terminal of the sector 2 may overlap with a pattern (1801 of FIG. 19) scheduled to be used in the sector 1. In this embodiment, as described above, existing communication of the sector 1 take precedence, and cooperation is not performed with the resource 1902 and existing communication shown in FIG. 18 are performed.

Figure 11:
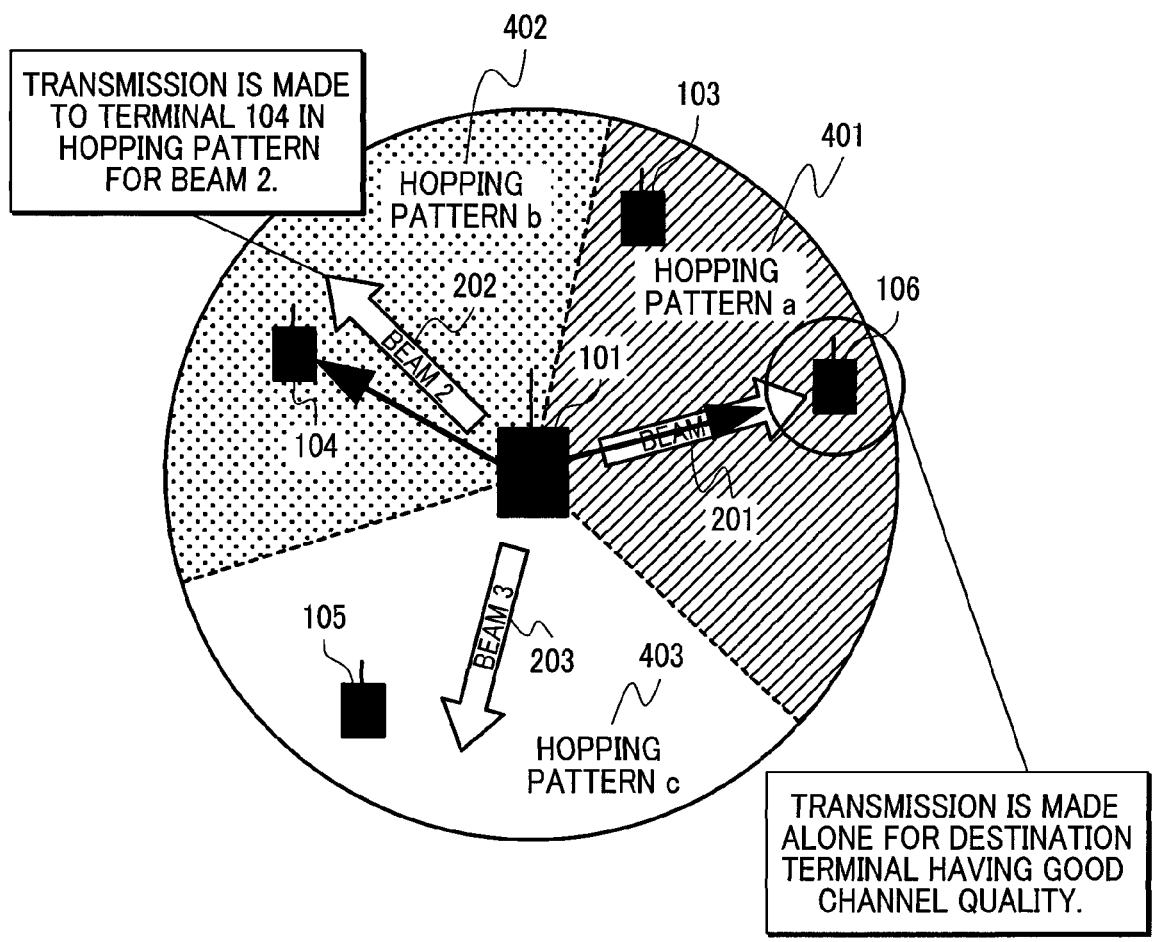
FIG. 11 is a conceptual diagram of system operation when no inter-sector cooperation occurs, in a first embodiment.

An example of operation of this embodiment by such control is described by flowcharts 11 and 12 of inter-sector cooperation operations. FIG. 11 shows an example of transmission of the sector 1 corresponding to a beam 201 to a terminal 106.

Figure 12:
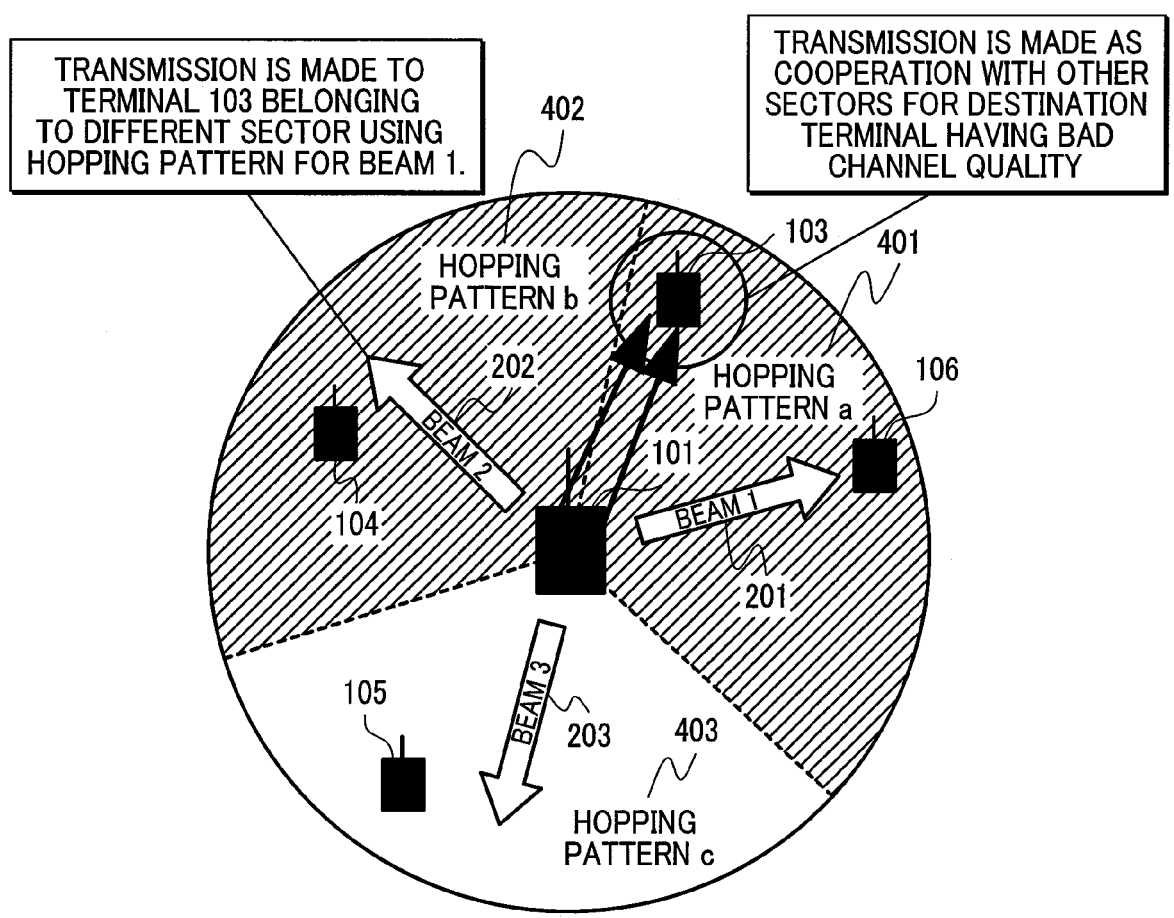
FIG. 12 is a conceptual diagram of system operation when inter-sector cooperation occurs, in a first embodiment.

Since the terminal 106 is in the front direction of the beam, and channel quality is good, the sector 1 performs transmission alone. Therefore, the sector 2 corresponding to a beam 202 can communicate with other terminals independently, and for example, can communicate with a terminal 104 at the same time. On the other hand, FIG. 12 shows an example of transmission of the sector 1 to a terminal 103. As described using FIG. 10, in this case, since the terminal 103 is poor in channel quality, the sector 1 requires cooperation with other sectors for transmission, and the sector 2 close to the terminal 103 is selected as a cooperation target by using the active set described previously. The base station 101 transmits data to the terminal 103 with time and frequency resources corresponding to a hopping pattern 401 of the sector 1 by using a directional beam 202 (beam 2). As a result, the terminal 103 can obtain higher channel quality than without cooperation without special awareness of inter-sector cooperation.

Figure 13:
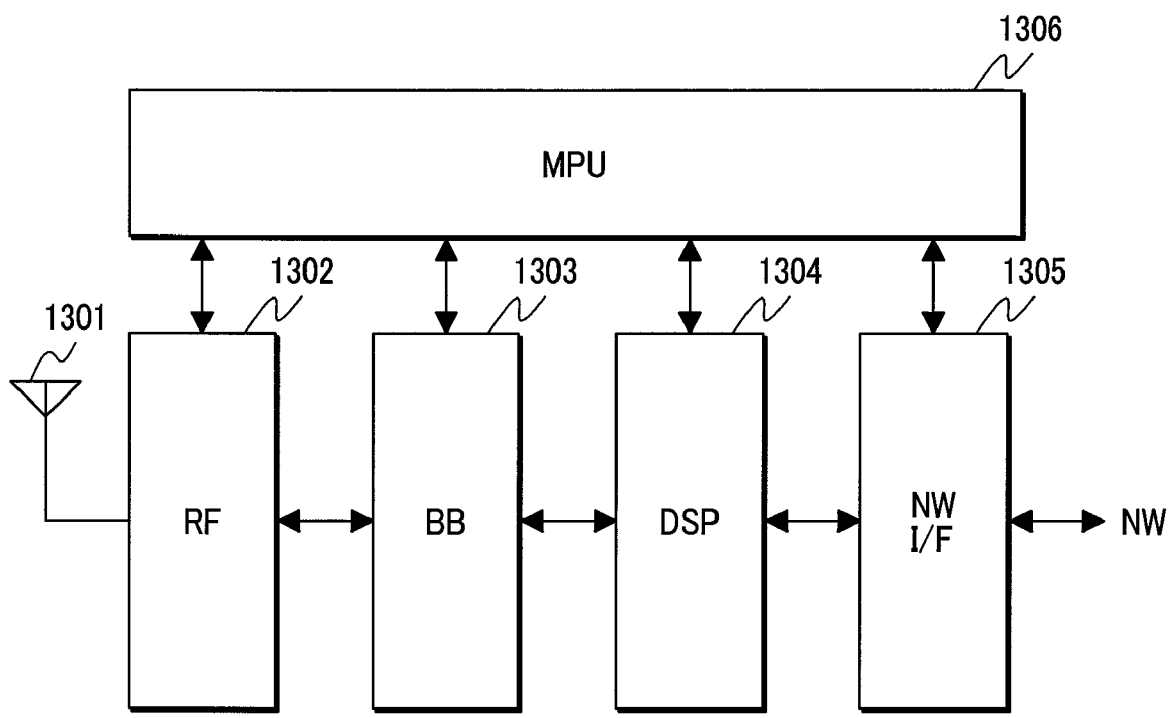
FIG. 13 is a drawing showing a concrete configuration example of a base station for implementing a first embodiment.

An example of a concrete configuration of the base station apparatus for implementing the above-described first embodiment is shown in FIG. 13. An antenna 1301 captures a radio signal and converts it into an electrical signal. An RF (Radio Frequency) unit 1302, during reception, down-converts a signal of an RF frequency received by an antenna 1301 into a signal of a baseband frequency, and converts an analog signal into a digital signal. The converted digital signal is sent to a baseband (BB) unit 1303. During transmission, the RF unit converts the digital signal sent from the baseband unit 1303 into an analog signal, and up-converts the analog signal of the baseband frequency to an RF signal. The up-converted signal is transmitted from the antennal 1301 after being amplified to a proper transmission power.

The baseband unit 1303, which performs almost all of OFDM signal processings, performs processings such as CP insertion/removal, FFT/IFFT processing, mapping/demapping, channel estimation, modulation/demodulation, and channel coding/decoding. The baseband unit 1303, according to commands of a DSP (Digital Signal Processor) 1304, performs processing of specified channel blocks and modulation/demodulation processing of control channels. A digital signal demodulated by the baseband unit 1303 is passed via the DSP 1304 or directly to a network interface unit 1305 (NW interface) though not shown, and reception information is sent to the network (NW). Information sent from the network is received in the network interface unit 1305, and is passed via the DSP 1304 or directly to the baseband unit 1303 though not shown. The information is mapped to channel blocks specified by the DSP 1304, based on a modulation system specified by the DSP 1304 in the baseband unit 1303 before being converted into baseband.

The MPU (Micro Processing Unit) 1306 manages the status and information of the entire radio equipment, and connects with the individual units to perform control such as the collection of management information and the settings of parameters. The MPU 1306, a general-purpose microprocessor, includes a processing unit and a storage unit internal or external to it. The storing unit stores programs executed by the processing unit, and is used as a work area.

The flow of FIG. 10 detailed previously describes a cooperation method between sectors in this embodiment. However, in FIG. 13, the MPU 1306 is a main unit that executes the flow, that is, a program. The MPU 1306 acquire various control information from the baseband unit 1303, the RF unit 1302, the DSP 1304, and the network interface unit 1305. On determining from the acquired information that inter-sector cooperation is required, the MPU 1300 changes assign information of time and frequency resources, stores the changed assign information in the storage unit, and passes the produced assign information of time and frequency resources to the baseband unit 1303.

Control information transmitted from a terminal as downstream channel quality information is sent to the MPU 1306 to be used to determine whether channel quality is below the first threshold (1002 of FIG. 10). Control information about an active set sent from the terminal is sent to the MPU 1306 via the DSP 1304, and the MPU 1306 forms an active set 1704 in the storage unit by using the control information, and can search for a cooperation destination sector (1003 of FIG. 10).

According to the first embodiment detailed previously, inter-sector cooperation is performed only during communication with terminals having bad channel quality, and when overlapping time and frequency resources exist during the cooperation, since the resources are used so that existing communication of a cooperation destination take precedence, no influence is exerted on the existing communication of the cooperation destination sector. As a result, without badly affecting the existing communication, channel quality of terminals having bad channel quality in a single sector can be increased.

SECOND EMBODIMENT

Figure 14:
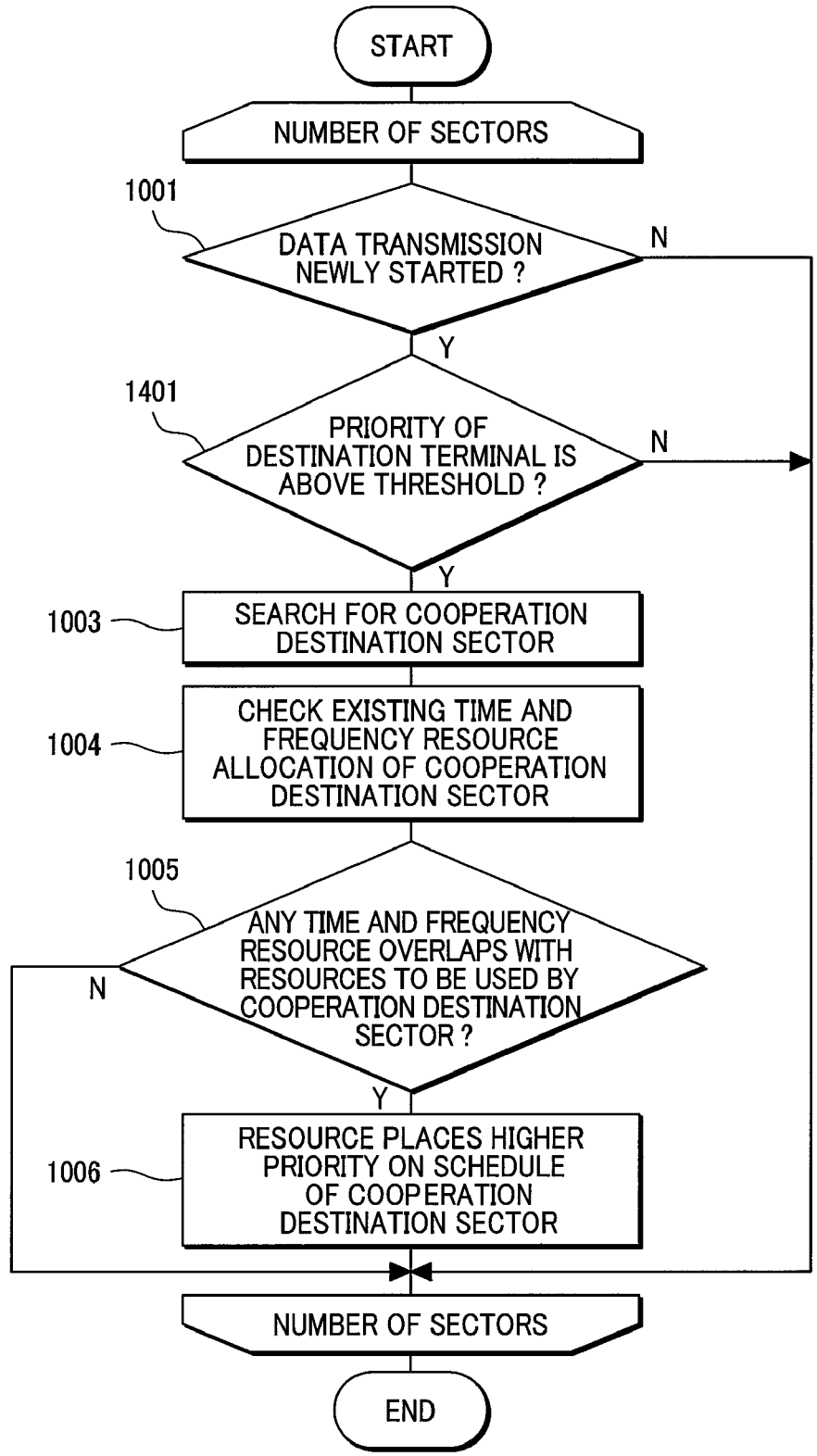
FIG. 14 is a flowchart of inter-sector cooperation operation in a second embodiment of the present invention.

A second embodiment will be described using FIG. 14. In the second embodiment, inter-sector cooperation is tried when priority (the degree of needing QoS (Quality of Service) control by service such as VoIP (Voice over IP)) of a transmission destination terminal is equal to or greater than a second threshold. When a cooperation destination sector overlaps with a resource to be used, the cooperation destination sector takes precedence. For example, in 3GPP2 C.R1001-E V1. 0 (2005-10), possible main services are defined in the form of Flow Profile ID, and a base station, when receiving the ID on services that the transmission destination terminal receives, can determine priority by associating the ID with the threshold (second threshold).

A sequence diagram of the second embodiment is the same as that of the first embodiment (see FIG. 9). FIG. 14 details inter-sector cooperation operation of the second embodiment. 1001 and 1003-1006 are the same as those of FIG. 10, except that implementation timing 1002 of inter-sector cooperation operation is decided according to the priority of a destination terminal (1401). Like the first embodiment, the MPU 1306 in a base station, according to the program processing, performs cooperation when the above-described ID received from the terminal is higher than a predetermined priority (second threshold).

According to this embodiment, inter-sector cooperation is performed only during communication with terminals having high priority, and the cooperation exerts no influence on existing communication of a cooperation destination sector. As a result, channel quality of terminals having high priority can be increased without badly affecting existing communication, and QoS requirements can be probably satisfied.

THIRD EMBODIMENT

Figure 15:
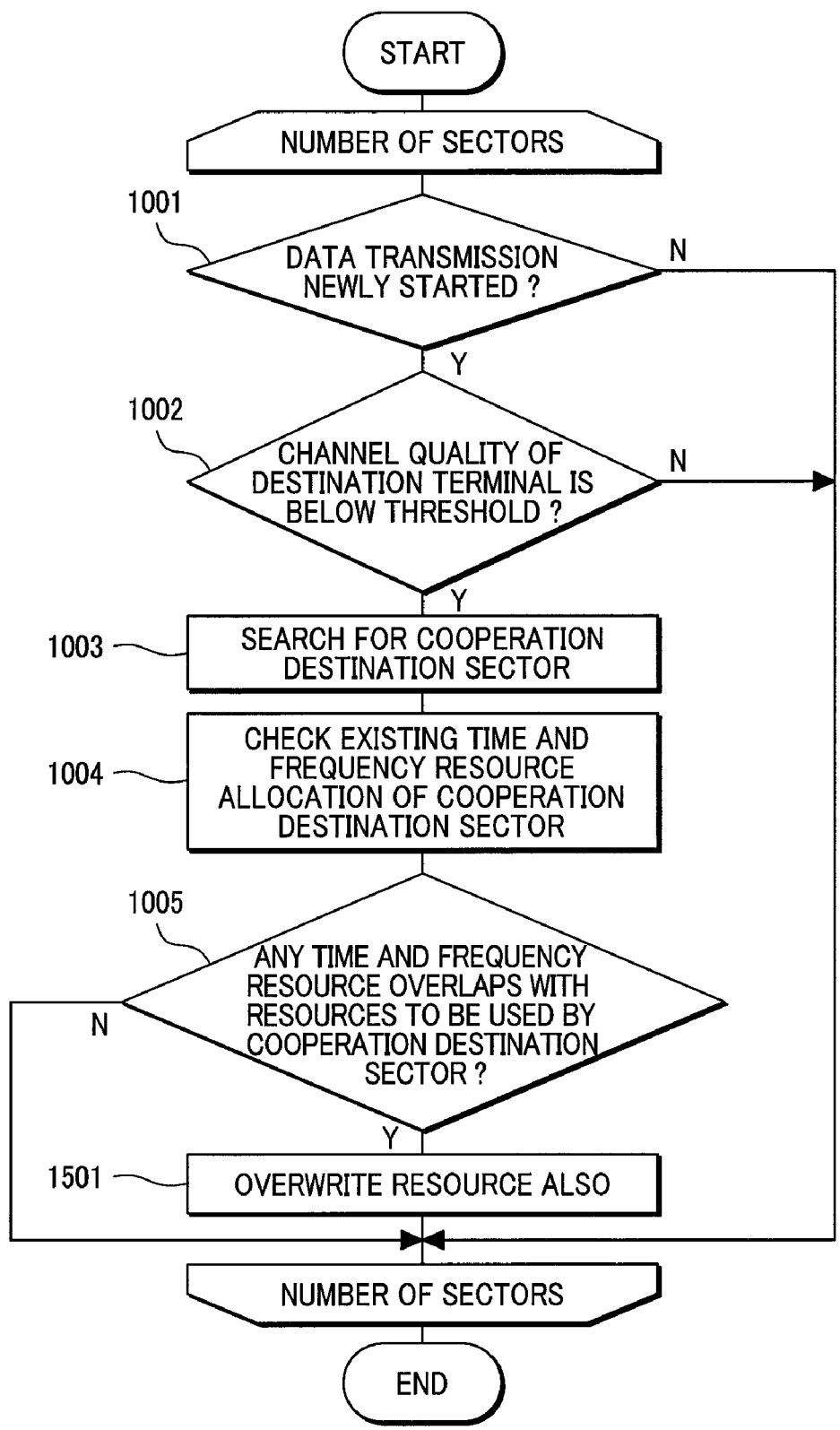
FIG. 15 is a flowchart of inter-sector cooperation operation in a third embodiment of the present invention.

A third embodiment will be described using FIG. 15. In the third embodiment, inter-sector cooperation is tried when channel quality of transmission destination terminal is below the first threshold, and when a cooperation destination sector overlaps with a resource to be used, resources are overwritten with a cooperation source sector taking precedence.

A sequence diagram of the third embodiment is the same as that of the first embodiment (see FIG. 9). FIG. 15 details inter-sector cooperation of the third embodiment. 1001 to 1005 are the same as those of FIG. 10, except that resources to be used are overwritten when they overlap with existing communication of a cooperation destination sector (1501). That is, with reference to FIG. 19, also for a resource 1902 being an overlapping pattern, cooperation operation is performed. It goes without saying that these processing are performed by program processing of the MPU 1306 in the base station, like the first embodiment. That is, the MPU 1306 overwrites any possible locations of overlapping with time and frequency resources to be used by a cooperation destination sector to change them, stores the changed resources in the storage unit, and passes assign information of the produced time and frequency resources to the baseband unit 1303.

According to this embodiment, inter-sector cooperation is performed only during communication with terminals having bad channel quality, and time and frequency resources of plural sectors are allocated for the terminals without fail. As a result, channel quality of target terminals can be certainly increased although existing communication may be somewhat badly affected. This embodiment may be used at the same time as the second embodiment.

FOURTH EMBODIMENT

Figure 16:
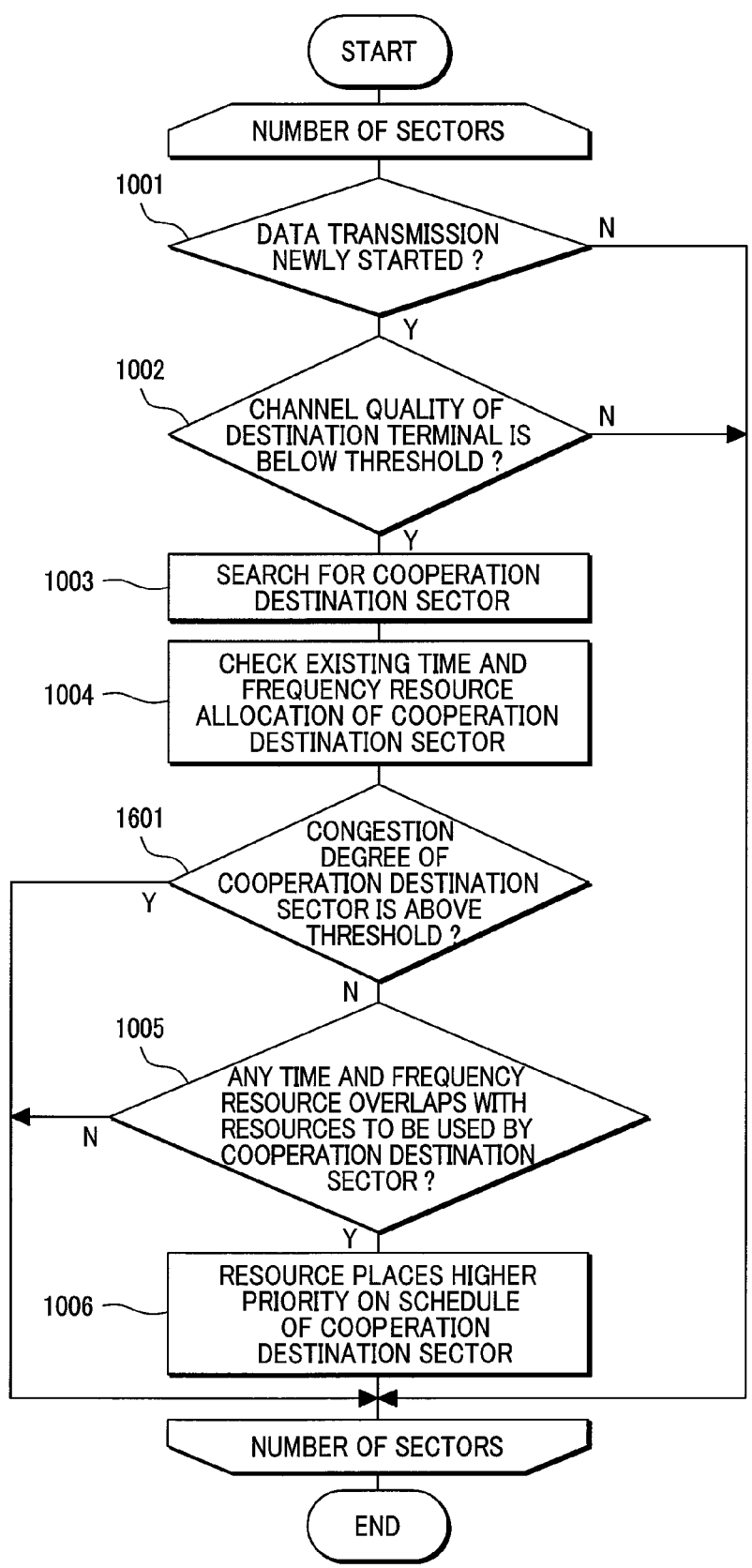
FIG. 16 is a flowchart of inter-sector cooperation operation in a fourth embodiment of the present invention.

A fourth embodiment will be described using FIG. 16. In the fourth embodiment, although inter-sector cooperation is tried when channel quality of a transmission destination terminal is below a threshold, cooperation is abandoned when a resource use ratio of a cooperation destination sector, that is, a congestion state is equal to or greater than a third threshold. Here, a resource use ratio indicating a congestion state can be defined, for example, in the example of FIG. 18, by counting resources to be used and calculating a ratio to the whole.

A sequence diagram of the fourth embodiment is the same as that of the first embodiment (see FIG. 9). FIG. 16 details inter-sector cooperation operation by the fourth embodiment. 1001 to 1006 are the same as those of FIG. 10, except that when a congestion degree is equal to or greater than a predetermined threshold (third threshold) as a result of checking the status of existing communication of a cooperation destination sector, the congestion is abandoned (1601). A congestion degree, that is, a congestion state can be determined based on the use ratio of time and frequency resources of the sector. It goes without saying that the MPU 1306 of the base station can calculate the resource use ratio by a program while referring to time and frequency resource information stored in the storage unit.

According to this embodiment, inter-sector cooperation is performed only during communication with terminals having bad channel quality, with the result that a bad influence on existing communication of a cooperation destination sector can be avoided without fail. As a result, while deterioration amounts of existing communication are suppressed below a target value, channel quality of terminals having bad channel quality in a single sector can be increased. Although this embodiment is described as a variant of the first embodiment, it goes without saying that use of the resource use ratio of a cooperation destination sector can be used at the same time as the second and third embodiments.

As has been detailed above, in cellular communication based on OFDMA (Orthogonal Frequency Division Multiple Access), while deterioration in system throughput is suppressed to a minimum level, channel quality of terminals near the boundaries of a sector can be increased, and bottleneck in QoS assurance service can be eliminated.

What is claimed is:

1. An OFDM (Orthogonal Frequency Division Multiplex) cellular radio communication method that uses plural sectors corresponding to the number of directional beams of a base station, the OFDM cellular radio communication method comprising the steps of:
    using, in the base station, first communication resources of time and frequency of a first sector for communicating with a terminal that belongs to the first sector;
    monitoring channel quality related to communication between the terminal and the base station;
    when the channel quality is lower than a first threshold, selecting second communication resources of time and frequency which are not being used for a terminal that belongs to a second sector;
    for communicating with the terminal, adding, in the base station, the selected communication resources of time and frequency of the second sector, the second sector being different from the first sector; and
    transmitting data to the terminal by cooperation between a first directional beam from the first sector and a second directional beam from the second sector,
    wherein both the first directional beam and the second directional beam are in accordance with a pattern of time and frequency used by the first sector.

2. The OFDM cellular radio communication method according to claim 1, wherein directional beams participating in the cooperation must have a congestion state of communication below a second threshold.

3. The OFDM cellular radio communication method according to claim 1, wherein the base station, when performing by the cooperation between the first and second directional beams, gives a preference to the cooperation in all patterns to use time and frequency resources of a downstream line to the terminal.

4. The OFDM cellular radio communication method according to claim 1, wherein the second sector is adjacent to the first sector.

5. The OFDM cellular radio communication method according to claim 1, wherein the base station refers to an active set of the terminal to decide the second sector.

6. An OFDM (Orthogonal Frequency Division Multiplex) cellular radio communication system in which a cell formed by a base station to communicate with a terminal is split into plural sectors corresponding to the number of directional beams,
    wherein, when channel quality to the terminal from the base station via a first sector to which the terminal belongs is lower than a first threshold, or when priority of communication of the terminal is higher than a second threshold, the base station selects time and frequency resources of a second sector which are not being used for a terminal of the second sector; adds, for communicating with the terminal, the selected time and frequency resources of the second sector, the second sector being different from the first sector; and transmits data to the terminal by a cooperation between a first directional beam of the first sector and a second directional beam of the second sector, and
    wherein both the first directional beam and the second directional beam are in accordance with a pattern of time and frequency used by the first sector.

7. The OFDM cellular radio communication system according to claim 6, wherein the base station uses only directional beams in the cooperation that have a congestion state of communication below a third threshold.

8. The OFDM cellular radio communication system according to claim 6, wherein the base station, when performing by the cooperation between the first and second directional beams, gives a preference to the cooperation in all of time and frequency resources used in a downstream line to the terminal.

9. The OFDM cellular radio communication system according to claim 6, wherein the second sector is adjacent to the first sector.

10. The OFDM cellular radio communication system according to claim 6, wherein the base station refers to an active set of the terminal to decide the second sector.

11. A base station in a cellular radio communication system in which a formed cell is split into plural sectors corresponding to the number of directional beams, the base station including a storage unit and a processing unit that controls communication with a terminal,
wherein the processing unit monitors channel quality related to communication between a first terminal which belongs to a first sector and the base station;
when the channel quality to the terminal from the base station is lower than a first threshold, selects a hopping pattern which is not being used for a second terminal in a second sector that is different from the first sector belongs, and transmits data to the first terminal by cooperation among the plural direction beams of the first sector and the second sector,
wherein the plural directional beams are in accordance with a pattern of time and frequency used by the first sector.

12. The base station according to claim 11, wherein the processing unit uses only directional beams in the cooperation that have a congestion state of communication below a second threshold.

13. The base station according to claim 11, wherein the processing unit, when performing by the cooperation among the plural directional beams, gives a preference to the cooperation in all of the hopping patterns used in a downstream line to the terminal.

14. The base station according to claim 11, wherein the processing unit refers to an active set of the terminal to decide the second sector.

15. The base station according to claim 14, wherein the second sector is adjacent to the first sector.

16. A radio communication system, comprising:
a radio communication terminal; and
a plurality of base stations, being able to communicate with the radio communication terminal by using radio resources of time and frequency zones;
wherein the radio communication terminal sends channel quality information of a received signal transmitted to the radio communication terminal from a first base station of the base stations using the radio resources, and
wherein the first base station receives the channel quality information from the radio communication terminal, and controls a signal transmission to the radio communication terminal by cooperating with a second base station different from the first base station according to the channel quality information,
wherein the first base station controls the signal transmission using a common radio resource, when the first base station cooperates with the second base station, and the radio resource of the second base station is not being used for a terminal that belongs to the second base station, and
wherein the common radio source is in accordance with a pattern of time and frequency used by the first base station.

17. The radio communication system according to claim 16, wherein the first base station controls to use one of the radio resources except a radio resource used by the second base station for the signal transmission to the radio communication terminal, to which the first base station does not communicate, when the first base station cooperates with the second base station.

18. The radio communication system according to claim 16, wherein the radio communication terminal and the base stations communicate by using frequency hopping, and the first base station executes the signal transmission to the radio communication terminal by using a radio resource having a same hopping pattern as the same one of the radio resources, when the first base station cooperates with the second base station.

19. The radio communication system according to claim 16, wherein the first base station executes the signal transmission by cooperating with the second base station, when the communication quality information is below a first threshold.

20. The radio communication system according to claim 16, wherein the first base station sets a priority to the radio communication terminal, and executes the signal transmission to the radio communication terminal by cooperating with the second base station, when the priority of the radio communication terminal is higher than a second threshold.

21. The radio communication system according to claim 16, wherein the first base station controls to use the radio resource, a congestion state of communication of which is below a third threshold, when the first base station cooperates with the second base station.

22. The OFDM cellular radio communication method according to claim 1, wherein the communication resources of time and frequency to be used are common between the first and second communication resources.

23. The base station according to claim 14, wherein the same patterns are used to transmit data to the terminal by the plural direction beams.

* * * * *